United States Patent [19]
Rettger, Jr.

[11] Patent Number: 5,551,719
[45] Date of Patent: Sep. 3, 1996

[54] PEDAL-PROPELLED TRICYCLE VEHICLE HAVING TWO MODES OF STEERING

[76] Inventor: Harry C. Rettger, Jr., 3557 Ridgewood Dr., Pittsburgh, Pa. 15235

[21] Appl. No.: 364,938

[22] Filed: Dec. 28, 1994

[51] Int. Cl.$^6$ ................................................. B62K 5/04
[52] U.S. Cl. ................................ 280/282; 280/775
[58] Field of Search ........................... 280/282, 261, 280/62, 775; 74/500, 486

[56] References Cited

U.S. PATENT DOCUMENTS

| | | | |
|---|---|---|---|
| 652,940 | 7/1900 | Whitney | 180/304 |
| 866,133 | 9/1907 | Herzog | 74/500 |
| 1,022,751 | 4/1912 | Packard | 74/486 |
| 1,175,744 | 3/1916 | Giles | 280/270 |
| 1,536,515 | 5/1925 | Methlin | 244/231 |
| 2,197,671 | 4/1940 | Vergara, Jr. | 74/486 |
| 2,203,810 | 6/1940 | Berry | 280/91 |
| 2,430,789 | 11/1947 | Stone | 74/486 |
| 3,157,243 | 11/1964 | Sellner | 180/333 |
| 3,395,930 | 8/1968 | Morgan | 280/775 |
| 3,403,927 | 10/1968 | Rettger, Jr. | 280/261 |
| 3,628,396 | 12/1971 | Grobowski | 74/493 |
| 4,749,207 | 6/1988 | Oh | 280/247 |

*Primary Examiner*—Kevin T. Hurley
*Attorney, Agent, or Firm*—Webb Ziesenheim Bruening et al.

[57] ABSTRACT

Tricycle vehicles of the type in which the rider provides the power for moving the vehicle, and more particularly, to improvements in the steering action and drive arrangement of tricycle vehicles of the type described. The tricycle includes a worm/worm gear arrangement that permits the steering wheel to be rotated about either rotational axes of the worm or worm gear to effect turning. A steering wheel clamping arrangement and slip clutch are also provided.

20 Claims, 6 Drawing Sheets

PEDAL-PROPELLED TRICYCLE VEHICLE HAVING TWO MODES OF STEERING

BACKGROUND OF THE INVENTION

1. Field of the Invention

This invention relates to tricycles, and more particularly, to steering mechanisms for tricycles.

2. Description of the Prior Art

Tricycle vehicles are known in which steering is effected by means of a single wheel at the rear of the vehicle. Examples of such tricycle vehicles will be found in U.S. Pat. Nos. 1,472,498, 1,520,523, 1,754,430, 1,778,143, 2,177,793 and my earlier U.S. Pat. No. 3,403,927, which is hereby incorporated by reference.

In these and other similar tricycle vehicles, steering is effected by linkage systems of a 1:1 ratio, that is to say, the steering wheel and the single rear wheel are turned simultaneously through the same number of angular degrees. Such steering systems are quick acting and stiff. Consequently, the steering is "jerky" and results in the zigzag motion normally seen in tricycle vehicles of the prior art. It should be evident that such steering systems do not, as would be desirable, simulate the steering action of a conventional automobile.

My earlier patent overcame this problem of the "jerky" steering. However, a problem still exists for people who, due to a physical disability, cannot rotate the tricycle steering column (or do not want to rotate the tricycle steering column). Furthermore, all conventional tricycles cannot be easily modified to accommodate various physical heights of the rider. Generally, either the seat or steering mechanism must be adjusted. This usually is not a problem if one person uses the tricycle over extended periods of time, say months. This can be a problem if several riders of various heights use the tricycle at the same time.

Therefore, it is an object of my invention to provide a steering mechanism for a tricycle that need not be rotated by the user.

It is a further object of my invention to provide a tricycle that can easily be adjusted to accommodate riders of various heights.

It is yet a further object of my invention to provide a tricycle having two modes of steering, one of which does not require turning of the steering wheel.

SUMMARY OF THE INVENTION

My invention is an improvement of a steerable toy vehicle having a frame, a driver's seat secured to the frame and three ground engaging wheels joined to the frame. The improvement includes a steering wheel having a central shaft rotatably connected to the frame. A linkage is coupled to the steering wheel and is connected to a single ground engaging wheel about a steering axis. The linkage is coupled to the steering wheel through the central shaft in a gearing arrangement. The gearing arrangement includes a worm carried by the central shaft and a worm gear joined to the frame in meshing relation with the worm. The rotational axes of the worm and the worm gear are substantially perpendicular. The central shaft is capable of rotating about both rotational axes of the worm gear and of the worm. Rotating the central shaft about either of the rotational axes of the worm gear and the worm causes the linkage to effect turning of the single ground engaging wheel.

A slip clutch can be provided that couples the steering wheel to the central shaft. The slip clutch can include a hollow collar extending from the steering wheel, wherein an upper end of the central shaft is received within the collar. A recessed portion is defined in the central shaft and is received by the collar. A fastener is received by both the collar and the recessed portion of the central shaft coupling the steering wheel to the central shaft. The fastener can be a set screw, and more than one set screw can be utilized. A bushing is positioned between the collar and the central shaft so that when a first torque about a first axis passing through the central shaft is applied to the steering wheel, both the central shaft and the steering wheel rotate and when a second toque, having a value greater than the first torque, is applied to the steering wheel, the steering wheel will rotate about the first axis relative to the central shaft. A second fastener can be provided passing through the collar and contacting the bushing.

An elongated slot can be defined in an arcuate-shaped portion of the frame having a sufficient length to permit the central shaft to rotate or pivot about the rotational axis of the worm gear. Preferably the slot is arcuate shaped.

A two-position clamp can be coupled to the central shaft. The clamp prevents the central shaft from rotating about the rotational axis of the worm gear when the central shaft is in a first position and the central shaft can rotate about the rotational axis of the worm gear when the clamp is in a second position. The worm and the worm gear can be provided in a gear box and the clamp can be coupled to the gear box. The gear box includes a gear box housing defining an inner chamber and two side plates secured to opposite sides of the gear box housing. The central shaft is received by the gear box housing and the worm and worm gear are disposed within the gear box housing. The gear box housing is rotatable about the worm gear rotational axis relative to the side plates. A slot is defined in one of the side plates. A threaded shaft passes through the slot and is secured to the gear box frame. A handle is threadably secured to the threaded shaft whereby when the handle is threadably tightened on the threaded shaft, the central shaft is prevented from rotating about the worm gear rotational axis relative to the slotted side plate. When the handle is threadably loosened on the threaded shaft, the central shaft can rotate about the worm gear rotational axis relative to the slotted side plate. The slotted side plate can be arcuate-shaped wherein the slot has a centerline which is an arc of a circle having a center on the worm gear rotational axis.

DESCRIPTION OF THE PREFERRED EMBODIMENT

Figure 1:
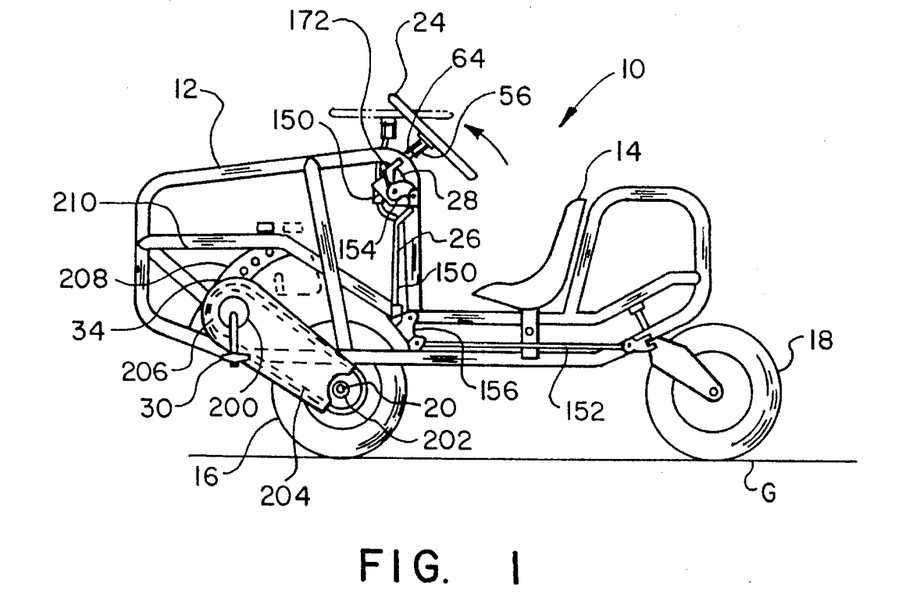
FIG. 1 is a side view of a tricycle vehicle made in accordance with the invention.
Figure 2:
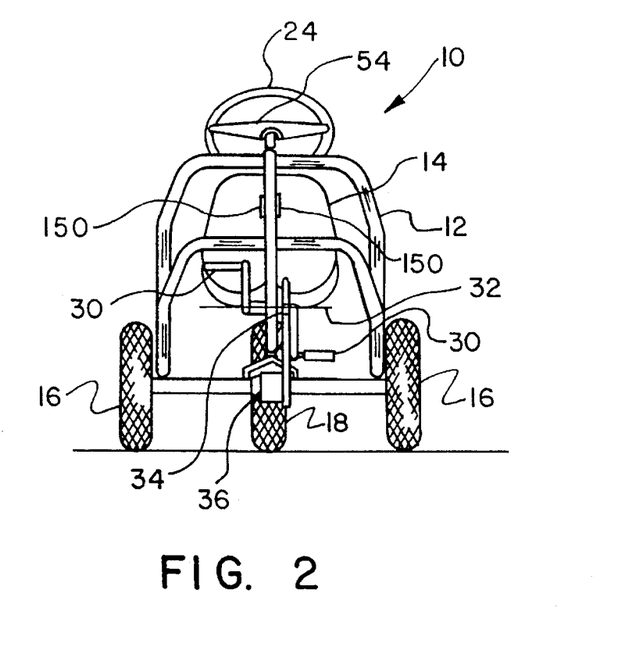
FIG. 2 is a front view of the tricycle vehicle shown in FIG. 1.
Figure 3:
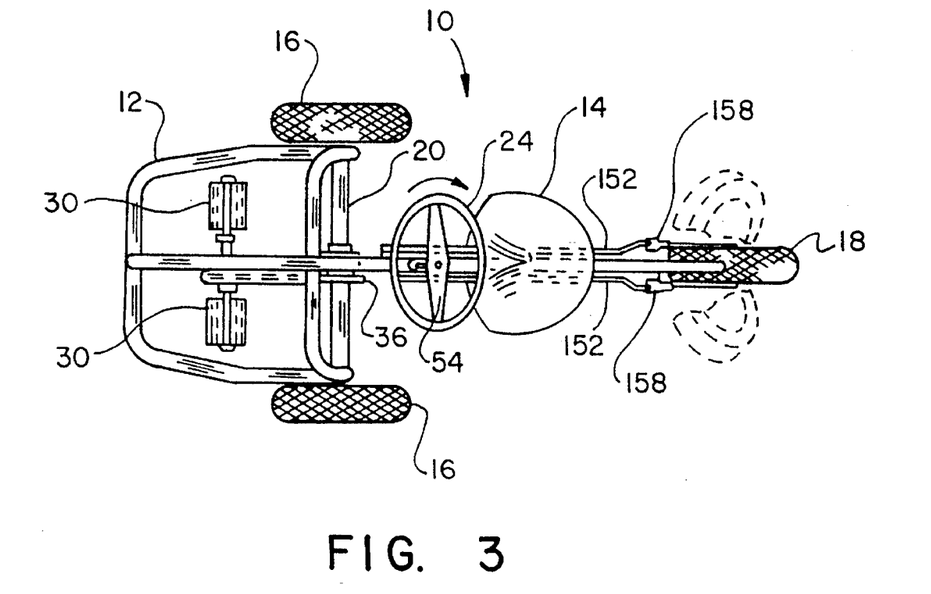
FIG. 3 is a plan view of the tricycle vehicle shown in FIGS. 1 and 2.

Reference is now directed to FIGS. 1–3, inclusive, wherein there is illustrated a tricycle vehicle 10 of the invention. The tricycle vehicle 10 includes a frame 12, preferably formed from tubular material and having a seat 14 secured thereto. As is conventional, the seat 14 is adjustable up and down as well as forward and backward. The vehicle 10 is rollably supported on a pair of front wheels 16 and a single rear wheel 18. The front wheels 16 include drive wheels and are journaled to the frame 12 by an axle 20 disposed ahead of the seat 14. The single rear wheel 18 serves to steer the vehicle 10 and is connected to the frame 12 by a pivot connection 22.

Figure 6:
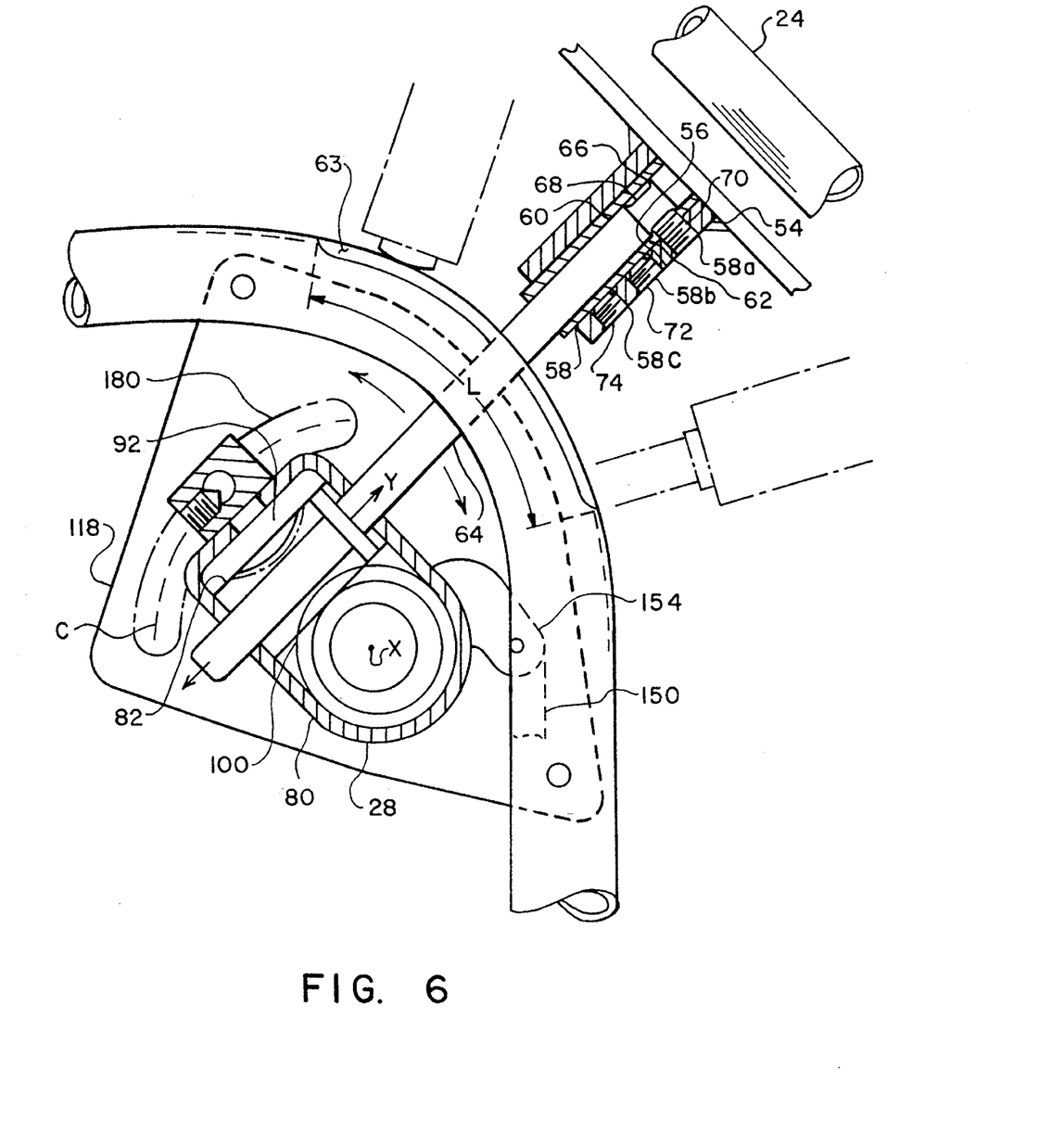
FIG. 6 is a side view partially in section of a portion of the tricycle vehicle showing a portion of the steering mechanism.
Figure 7:
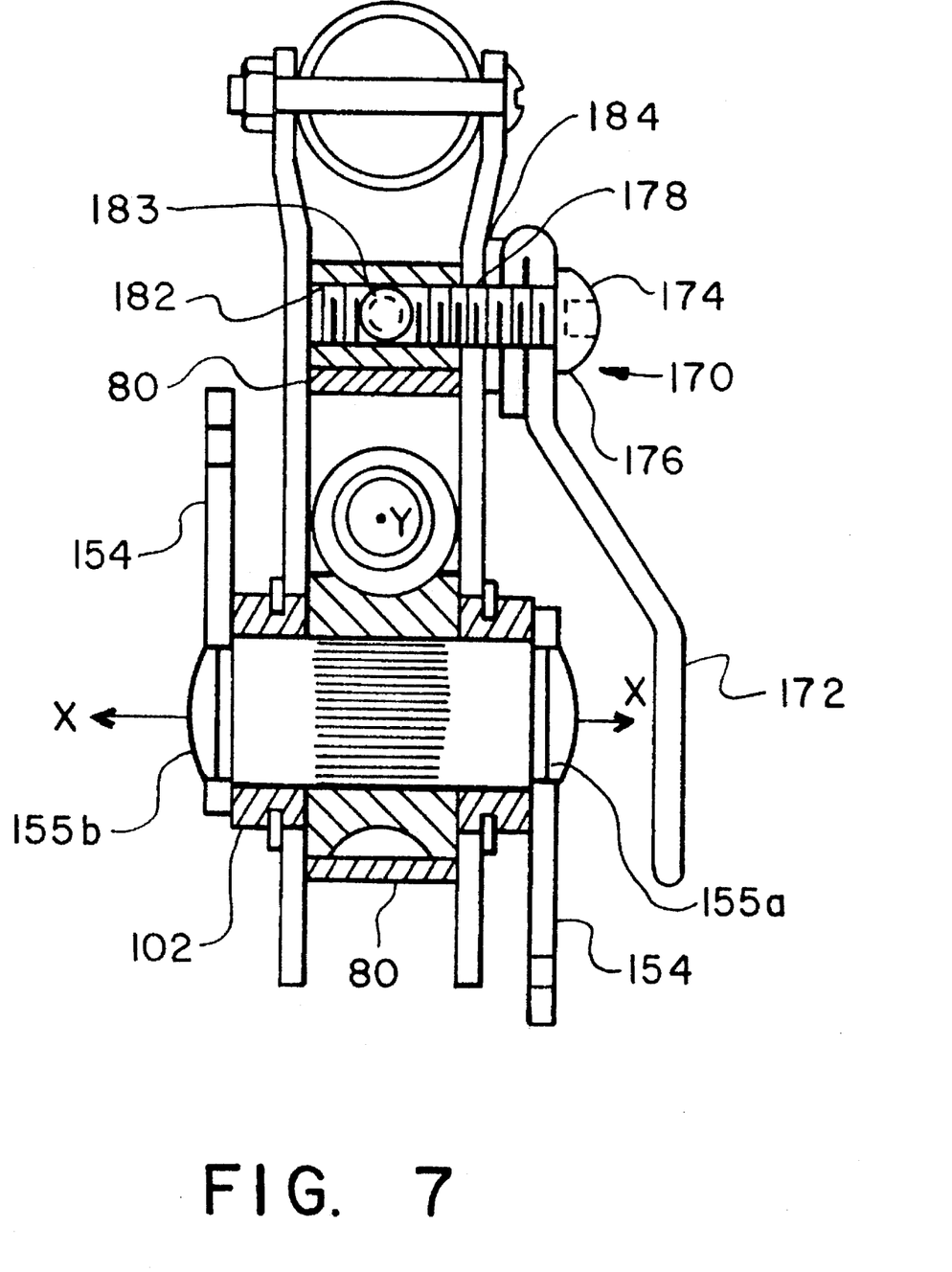
FIG. 7 is a top view partially in section showing a portion of the steering mechanism and a steering locking mechanism.
Figure 8:
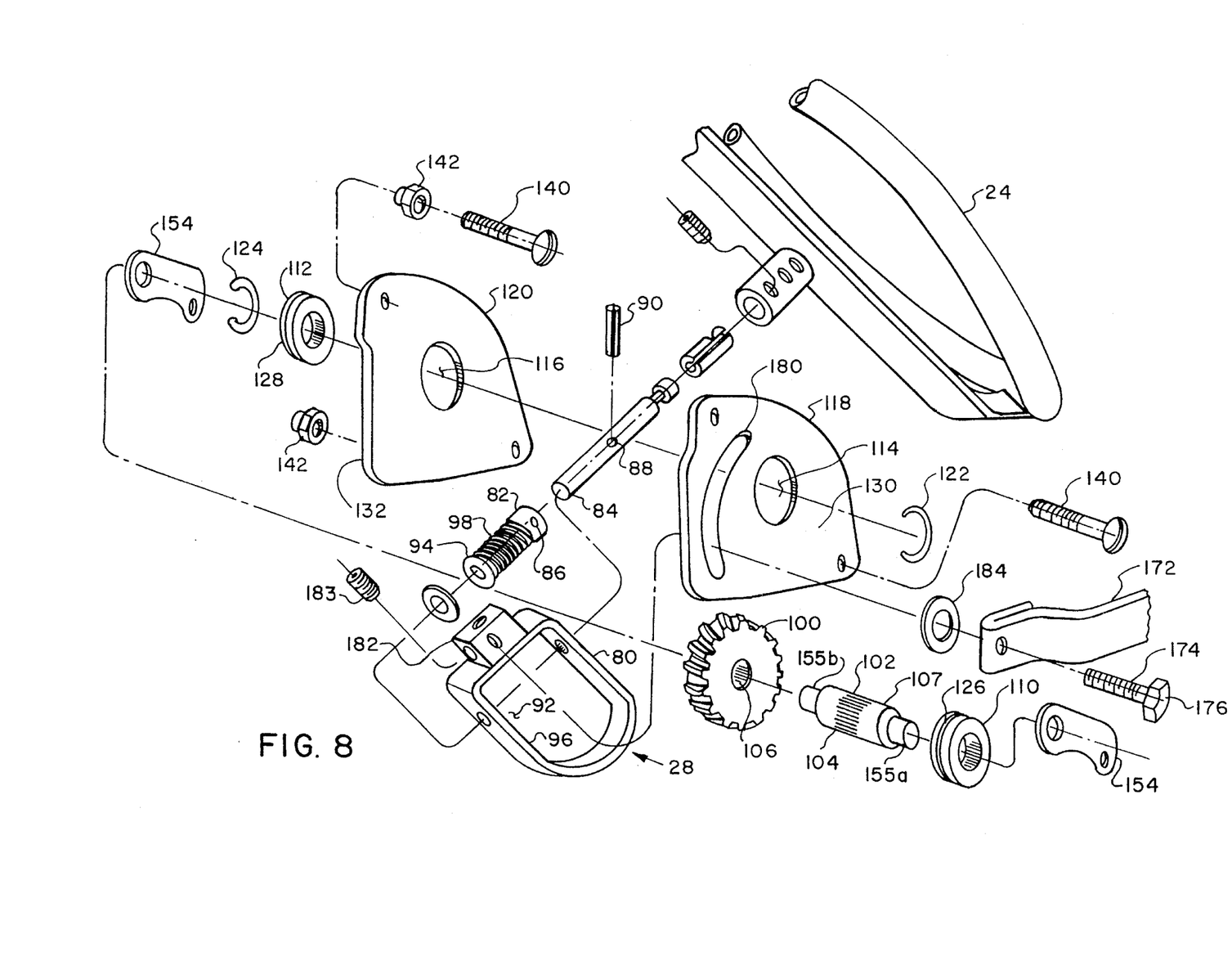
FIG. 8 is an exploded view of a portion of the steering mechanism and the locking mechanism.

Steering of the vehicle 10 is effected by a steering wheel 24 acting through a linkage 26 to turn the rear wheel 18. The steering wheel 24 is connected or coupled to the linkage 26 by a gearing arrangement (as shown in FIGS. 6–8) housed within a gear box 28. As will be described, the gear arrangement is such that multiple revolutions of the steering wheel 24 are required to turn the single rear wheel 18. Consequently, the steering action of the vehicle 10 simulates, to a great extent, the steering action of a conventional automobile.

The vehicle 10 is powered by a rider, such as a child. The child forcibly rotates a pair of foot pedals 30 that are journaled to the frame 12 for rotation about a pedaling axis 32. As is conventional, the pedaling axis 32 is substantially parallel to the rolling axis of the front wheels 16. The foot pedals 30 are positioned ahead of all of the wheels 16 and 18 so as to effect a more efficient distribution of the child's weight relative to the front wheels 16.

As shown in FIG. 1, a torque transferring arrangement 34 is provided for forcibly rotating the axle 20 and hence the front wheels 16. A differential gearing arrangement 36, best seen in FIG. 2, is carried by the axle 20 and is connected to the torque transferring arrangement 34. The overall arrangement is such that when the vehicle 10 is turned to the left, for example, the left one of the front wheels 16, as viewed in FIG. 2, will rotate at a slower speed than the right one of the wheels 16 or be completely stopped, depending on the sharpness of the turn being executed. The specific operation of the differential gearing arrangement is disclosed in U.S. Pat. No. 3,403,927.

Steering Arrangement

The steering arrangement of the vehicle 10 will now be more fully described with reference to FIGS. 1 and 4–8, inclusive.

Figure 4:
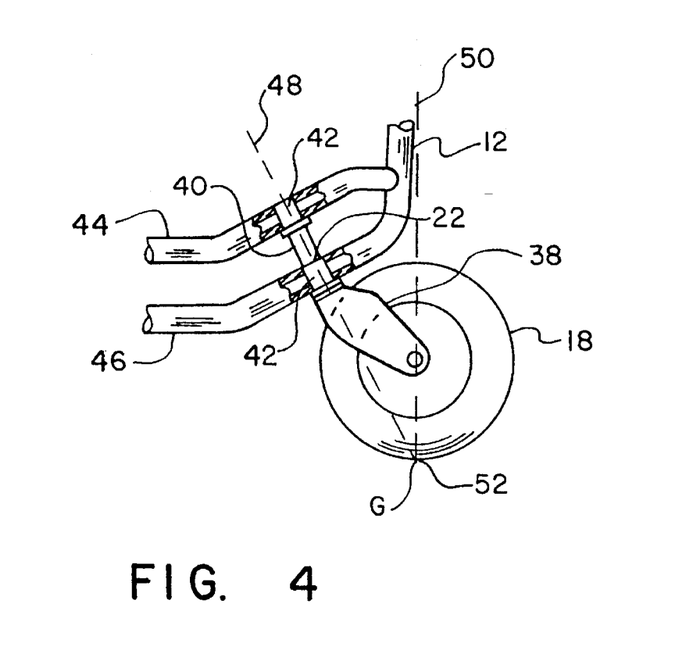
FIG. 4 is a fragmentary side view, on an enlarged scale, illustrating a single rearwardly mounted wheel employed for steering the tricycle vehicle.

Referring now to FIG. 4, the rear wheel 18 is rotatably connected to a clevis member 38 having a central shaft 40 extending through bushings 42 fitted in central frame members 44 and 46 of the frame 12. The clevis member 38 and hence the rear wheel 18 are pivotal about a steering axis indicated by the dash-dot line 48 which actually comprises the central axis of the central shaft 40. It is to be noted that the steering axis is inclined forwardly toward the seat 14 (not visible) and intersects with a vertical centerline 50 of the wheel 18 at a point 52, that is, the point at which the rear wheel 18 touches the ground G. Consequently, the rear wheel 18 swings from side-to-side as illustrated in dotted outline in FIG. 3, rather than rotating about the vertical centerline 50. This arrangement permits relatively sharp turns to be made with minimum wear on rear wheel 18. It should also be noted that the rear wheel 18 and clevis member 38 comprise a caster-like arrangement which, combined with the inclined steering axis 48, keep the rear wheel 18 tracking whereby the vehicle 10 tends to move forward along a straight line. Consequently, if the steering wheel 24 is released at the completion of a turn, the rear wheel 18 will return to its normal straight position.

Referring now to FIGS. 1, 6 and 8, the steering wheel 24 is substantially circular shaped. A cross bar 54 extends across the steering wheel 24. As shown in FIG. 6, a cylindrical hollow sleeve or collar 56 extends from the cross bar 54. Three threaded holes 58a, 58b and 58c are defined on the sleeve 56. A C-shaped bushing 60 is received within the hollow sleeve 56. The bushing 60 defines a hole 62 that coaxially aligns with hole 58a. A central cylindrical steering shaft 64, which is rotatably connected to the frame 12, has an upper end portion 66 received by the bushing 60 and a lower portion extending through an elongated slot 63 defined in an arcuate-shaped portion of the frame 12 adjacent the gear box 28. The upper end portion 66 of the shaft 64 includes a recessed portion 68, which is positioned adjacent hole 62. A cavity 69 is defined by the recessed portion 68. Fasteners or set screws 70, 72 and 74 are threadably received by sleeve 56 in holes 58a, 58b and 58c, respectively. As can be seen, the bushing 60 is positioned between the collar 56 and the shaft 64, and set screw 70 passes through a hole defined in bushing 60. Set screw 70 is received by the recessed portion 68 of the shaft 64 within the cavity 69 and is spaced away from the shaft 64. Set screw 70 keeps the bushing 60 oriented with the hollow collar 56 and also keeps the steering wheel from coming off the steering shaft 64 in a longitudinal direction. Set screws 72 and 74 abut tightly against adjacent portion of the bushing 60. In this manner, the steering wheel 24 is secured or coupled to the shaft 64.

As shown in FIG. 8, gear box 28 includes a gear box housing 80. The gear box housing 80 includes two spaced-apart coaxial holes through which the shaft 64 slidably passes. A worm 82, having an annular hole passing therethrough, is slideably received by an end 84 of the shaft 64. Holes 86 and 88 are defined in both the worm 82 and the shaft 64, respectively. Holes 86 and 88 are coaxially aligned and positioned adjacent each other. A pin 90 passes through holes 86 and 88 thereby securing worm 82 to the shaft 64, so that the worm 82 is carried by the shaft 64, within an interior portion or inner chamber 92 of the gear box housing 80. A washer 94 is also received by the shaft 64 and is sandwiched between an inner surface 96 of the gear box housing 80 and an end 98 of the worm 82. One type of worm is a sixteen pitch double thread (right hand) Hindley worm having a 14½° pressure angle.

A worm gear 100 joined to frame 12 is disposed within the interior portion 92 of the gear box housing 80 and is in meshing relation with the worm 82. As should now be evident, both the worm 82 and the worm gear 100 are provided in the gear box 28. A worm gear shaft 102 is secured to the worm gear 100, via a press fit between a knurled section 104 of the worm gear shaft 102 and an inner surface 106 of worm gear 100. Portions 107 and 108 of the gear shaft 102 are slideably received by bearings 110 and 112. The gear shaft 102 is capable of rotating about a longitudinal X axis passing therethrough, relative to bearings 110 and 112. Bearings 110 and 112 pass through holes 114 and 116 defined in side plates 118 and 120, respectively, of the gear box 28. Plates 118 and 120, which are secured to the gear box housing 80, sandwich the gear box housing 80 on opposite sides thereof forming the gear box 28. C-shaped retaining rings 122 and 124 are received by slots 126 and 128 defined by bearings 110 and 112. Retaining ring 122 is sandwiched between an outer surface 130 of side plate 118 and bearing 110, and retaining ring 124 is sandwiched between an outer surface 132 of side plate 120 and bearing 112. The rotational axes (Y and X) of the worm 82 and the worm gear 100 are substantially perpendicular to each other and the number of threads on the worm 82 is considerably less than the number of teeth on the worm gear 100. To effect a turning of the worm gear 100 through a specific number of angular degrees, it is necessary to rotate the worm 82 through a greater number of angular degrees. Consequently, multiple revolutions of the steering wheel 24 are required to turn the rear wheel 18 and the vehicle 10.

Figure 5:
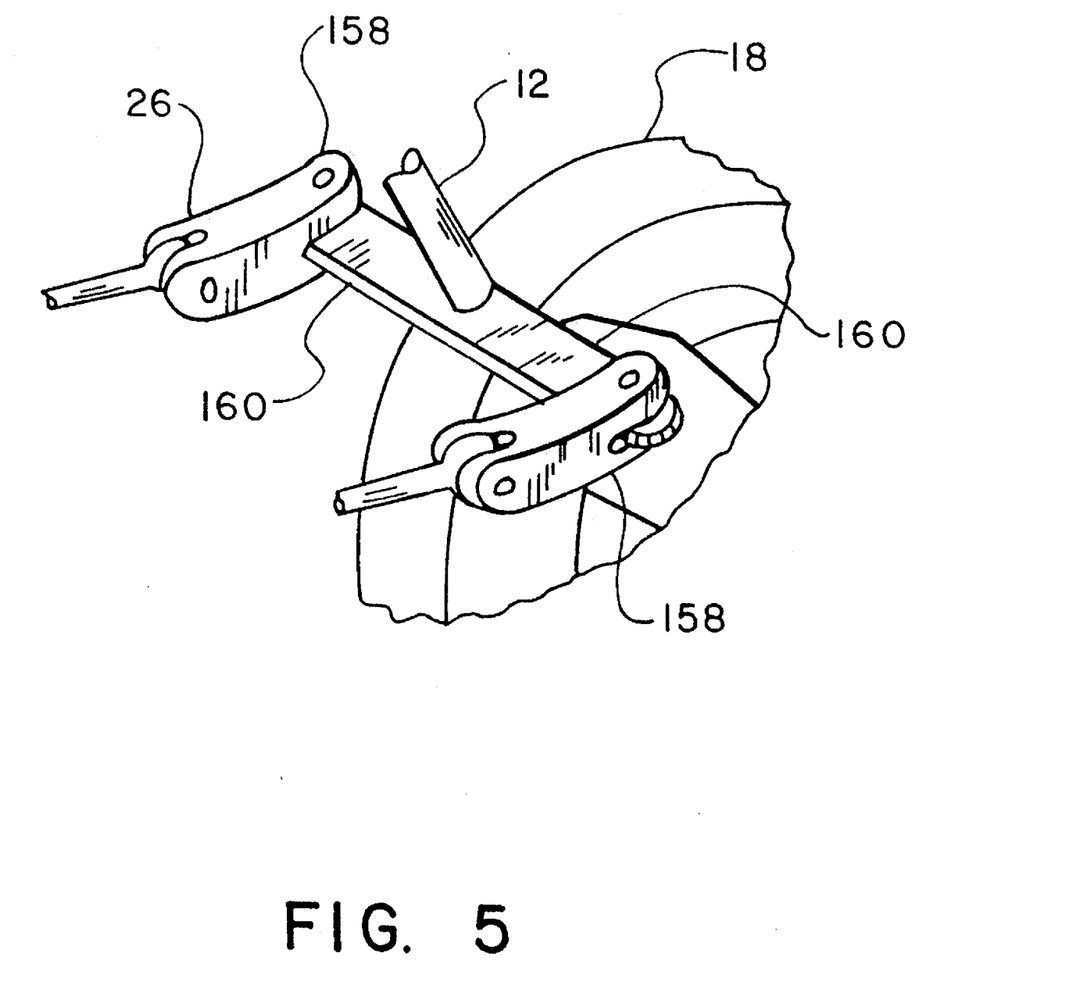
FIG. 5 is a top perspective view of a portion of the tricycle vehicle showing a portion of a steering mechanism.

Referring now to FIG. 1, the linkage arrangement 26 includes a pair of generally vertical link arms 150 and a pair of generally horizontal link arms 152. One each of the link arms 150 and 152 is positioned on each side of the central frame member 12. As can best be seen in FIGS. 1 and 6, the vertical link arms 150 have their upper ends pivotally secured to lever arms 154 which, in turn, are secured to the gear shaft 102 at ends 155a and 155b. The lever arms 154 extend in diametrically opposite directions from the gear shaft 102 so that as the gear shaft 102 is rotated, one of the vertical link arms 150 will be raised while the other vertical link arm 150 will be lowered. The lower ends of the vertical link arms 150 are each pivotally connected to a separate link plate 156 which, in turn, is pivotally connected to the central frame 12. The horizontal link arms 152 have one of their ends pivotally connected to one of the link plates 156 and their opposite ends pivotally connected to universal joint members 158. As shown in FIG. 5, the universal joint members 158 are, in turn, pivotally connected to extension arms 160 of the clevis member 38.

Referring to FIGS. 1 and 6–8, gear box 28 is secured to the frame 12 adjacent slot 63 by screws 140 and locking nuts 142. Screws 140 pass through the frame 12 and appropriate holes defined in plates 118 and 120. A steering wheel tilt locking arrangement 170 is secured to gear box 28. The steering wheel tilt locking arrangement or clamp 170 is coupled to the gear box 28 that includes a handle 172 threadably received on a screw 174 having a head 176 and a threaded shaft 178. The threaded shaft 178 passes through an arcuate-shaped slot 180 defined in plate 118. The slot has a centerline C which is an arc of a circle having a center on the X axis. An end of the threaded shaft 178, opposite of the head 176, is received in a block 182 through a first hole. The block 182 is welded to the gear box housing 80. A threaded hole is defined in the block 182 transverse to the first hole and threadably receives a set screw 183 which abuts against the threaded shaft 178, thereby holding the threaded shaft 178 in place and securing it to the gear box housing 80. A washer 184 is received on the threaded shaft 178 positioned between the handle 172 and the side plate 118. The thickness of the washer 184 and the handle 172, where the threaded shaft 178 passes, is less than the length of the threaded shaft 178 positioned between the screw head 176 and the side plate 118. When the handle 172 is rotated about an axis passing through threaded shaft 178 in a first direction (clockwise), the handle 172 abuts against the washer 184; and when the handle 172 is rotated in a second direction (counterclockwise), the handle 172 abuts against the screw head 176.

The overall arrangement permits two modes for turning the tricycle vehicle 10.

A first mode in which the shaft 64 is rotated about its own axis (the Y axis) to rotate the worm gear 100 to move the lever arms 154, and a second mode in which the shaft 64 together with the gear box housing 80 and worm gear 100 are rotated about the axis of the worm gear 100 (the X axis) to move the lever arms 154. In the first mode, the handle 172 is rotated in the first direction so that the block 182 abuts against an inner surface of the side plate 118. In this manner, the side plate 118 and the washer 184 are sandwiched between the block 182 and the handle 172. This frictional engagement prevents the gear box housing 80 from moving relative to the side plates 118 and 120, thereby locking the shaft 64 in place relative to the side plates 118 and 120. This permits the shaft 64 to rotate about an axis passing therethrough (in this case, the Y axis) and prevents the shaft 64 from rotating about the X axis relative to the side plate 118 and moving along a length L of the slot 63. To make a right turn, for example, the steering wheel 24 is rotated in a clockwise direction, as viewed in FIG. 3. The worm 82 likewise is rotated in the clockwise direction thereby rotating the worm gear 100 about the X axis passing through the worm gear shaft 102. This causes the lever arms 154 to rotate so that this action causes the right-hand vertical link arm 150 to be raised by the right-hand lever arm 154 whereby the right-hand horizontal link arm 152 is pulled forwardly to turn the rear wheel 18 in a counterclockwise direction about the steering axis 48. At the same time this causes the left-hand lever arm 154 to rotate so that the left-hand vertical link arm 150 is lowered whereby the left-hand horizontal link arm 156 is pushed rearwardly to aid in turning the rear wheel 18 in a counterclockwise direction about the steering axis 48. To make a left turn, the above-described sequence will, of course, be reversed.

It should now be apparent that the above-described steering arrangement provides a smooth steering action which is much like the steering action of a conventional automobile. Consequently, the steering motion of the vehicle 10 is smooth rather than being jerky as is the case of the prior art tricycle vehicles. Although the child is able to whip or rotate the steering wheel 24 in a very rapid manner to effect a sharp turn, the rear wheel 18 will not be turned in such a quick manner that the vehicle 10 will upset.

In the second mode, the handle 172 is rotated in the second direction so that the handle 172 is sufficiently spaced away from the side plate 118. Preferably, a gap should be present between the washer 184 and the handle 172 in this mode, while no gap would be present in the first mode. This will permit the shaft 64, together with the gear box housing 80 and worm gear 100, to be rotated or pivoted about the X axis relative to the side plate 118 so that the shaft 64 can move along the slot 63. The slot 63 is of sufficient length to permit the shaft 64 to pivot about the X axis, i.e., the rotational axis of the worm gear 100. The shaft 64 is capable of pivoting about the X axis along with the gear box housing 80 and the worm 82.

Since the worm teeth WT are engaged or meshed with the worm gear teeth WGT, movement of the worm 82 causes the worm gear 100, the worm 82 and the gear box housing 80 to rotate about the X axis passing through the worm gear shaft 102. The gear box housing 80 rotates about the X axis relative to the side plates 118 and 120. (Also, in this second mode, the worm gear 100 can be rotated about the Y axis by rotating the steering wheel 24 about the Y axis passing through the shaft 64.) When the steering wheel 24, and in turn the shaft 64, is moved toward the ground G, lever arms 154 rotate in the same manner as if the steering wheel 24 is rotated in a clockwise direction. This action causes the right-hand vertical link arm 150, through the right-hand lever arm 154, to raise whereby the right-hand horizontal link arm 152 is pulled forwardly to turn the rear wheel 18 in a counterclockwise direction about the steering axis 48, resulting in a right turn. Likewise, at the same time, this causes the left-hand lever arm 154 to rotate so that the left-hand vertical link arm 150 is lowered whereby the left-hand horizontal link arm 152 is pushed rearwardly to aid in turning rear wheel 18 in a counterclockwise direction about the steering axis 48. To make a left turn, the steering wheel 24 is moved upwardly away from the ground G.

The worm 82/worm gear 100 arrangement prevents the steering wheel 24 from rotating about the Y axis when the steering wheel 24 is raised and lowered or pivoted about the X axis, unless the rider intentionally rotates the steering wheel 24 about the Y axis. This is due to the physical characteristics and the mechanical advantage of the worm 82 and worm gear 100, whereby only the worm 82 can drive the worm gear 100, not vice versa. Thus, pivoting the steering wheel 24 about the X axis will only turn the rear wheel 18 and will not cause steering wheel 24 to rotate. Other types of gearing arrangements such as bevel-type gears, in lieu of the worm 82/worm gear 100 arrangement, could result in the rotation of the steering wheel 24 about the Y axis without the rider intentionally rotating the steering wheel 24 about the Y axis when the steering wheel 24 is pivoted about the X axis, and would not be satisfactory in this application.

Hence, the shaft 64 is capable of rotating about both the X and Y axes of the worm 82 and the worm gear 100, whereby, depending on which mode the tricycle is in, rotating the shaft 64 about either of the rotational X and Y axes causes the linkages 150 and 152 to effect turning of the rear wheel 18.

Alternatively, the steering wheel 24 can be raised and lowered (pivoted about the X axis) as well as rotated about the Y axis to effect steering. Also, the steering wheel 24 can be removed from the shaft 64 and steering can be effected in the second mode by moving the shaft 64 along slot 63. Further, the position of the steering wheel 24 can be adjusted if the user wants to steer the tricycle in the first mode manner by rotating the handle 172 in the counterclockwise direction so that the shaft 64 can move along slot 63. When the steering wheel 24 is in the proper position, then the shaft 64 is locked in place by rotating the handle 172 in the clockwise direction. Steering is then effected as described in the first mode.

The bushing 60 and set screws 72 and 74 form a slip clutch arrangement whereby the steering wheel 24 will slip about the shaft 64 should a torque greater than or equal to T about the Y axis be applied to shaft 64. In other words, both the shaft 64 and the steering wheel 24 will not rotate relative to each other about the Y axis when a torque less than T is applied to the shaft 64 through the steering wheel 24 about the Y axis. However, the steering wheel 24 will rotate relative to the shaft 64 if the torque applied to the steering wheel 24 is greater than T, since the steering wheel 24 will slip, through the slip clutch, on the shaft 64. This will prevent stripping of the teeth of both worm 82 and the worm gear 100. Should the steering wheel 24 slip through the slip clutch arrangement, then set screws 72 and 74 may need to be tightened.

Hence, it should now be apparent that the steering wheel 24 can be quickly and easily adjusted to accommodate users of various heights by loosening and tightening handle 172. Further, it should be apparent that the tricycle 10 can be steered in a manner that the steering wheel 24 need not be rotated about the Y axis but can be pivoted about the X axis. In this manner, the tricycle 10 can accommodate users who, because of a physical constraint, cannot rotate the steering wheel about the Y axis. Further, it provides the users two modes of steering which can make steering the tricycle more enjoyable than if only one mode of steering were available, as is in the case in the prior art.

Drive Arrangement

The drive arrangement of the vehicle 10 is the same as that described in U.S. Pat. No. 3,403,927 and will generally be described below.

Referring now to FIG. 1, it will be seen that the torque transferring arrangement 34 includes a drive sprocket 200 rotatable by the foot pedals 30, a driven sprocket 202 for rotating the axle 20 and an endless drive chain 204 extending between and around the sprockets 200, 202. A chain guard 206 is provided which, as can be seen in FIG. 1, covers the drive sprocket 200, and substantially all of the drive sprocket 202 and the drive chain 204. The foot pedals 30 are positioned ahead of the front wheels 16. In this arrangement, the child's weight is more evenly distributed ahead of and behind the front wheels 16, especially during driving of the vehicle 10. Therefore, the vehicle 10 is considerably more stable than if the foot pedals 30 were mounted directly on the axle 20 or if the foot pedals 30 were positioned between the wheels 16 and 18 as is the case of some prior art tricycle vehicles. Furthermore, by positioning the foot pedals 30 ahead of the front wheels 16, better traction is afforded between the front wheels 16 and the ground G. The aforesaid differential gearing arrangement 36 permits the front wheels 16 to rotate at the same angular velocity when the vehicle 10 is moving in a straight line and to rotate at different angular velocities when the vehicle 10 is turning.

Referring again to FIG. 1, it will be seen that the foot pedals 30 are detachably connected to and supported on a plate 208 having a plurality of apertures 210. The apertures 210 are equidistant from the central axis of the front wheels 16. Consequently, the foot pedals 30 and the drive sprocket 200 may be positioned at a number of locations, corresponding to the apertures 210, closer to or further from the seat 14.

Although the invention has been shown in connection with one specific embodiment, it will be readily apparent to those skilled in the art that various changes in form and arrangement of parts may be made to suit requirements without departing from the spirit and scope of the invention.

I claim:

1. In a steerable toy vehicle having a frame, a driver's seat secured to said frame, and three ground engaging wheels joined to said frame, the improvement comprising:

a steering wheel having a central shaft rotatably connected to said frame, a linkage coupled to said steering wheel and connected to one of said ground engaging wheels about a steering axis, said linkage coupled to said steering wheel through said central shaft and a gearing arrangement, said gearing arrangement includes a worm carried by said central shaft and a worm gear joined to said frame in meshing relation with said worm, the rotational axes of said worm and said worm gear being substantially perpendicular; and said central shaft capable of rotating in a first mode about said rotational axis of said worm to cause said linkage to effect turning of said one of said ground engaging wheels, and said central shaft capable of rotating in a second mode about said rotational axis of said worm gear to also cause said linkage to effect turning of said one of said ground engaging wheels.

2. The steerable toy as claimed in claim 1 further comprising a slip clutch coupling said steering wheel to said central shaft.

3. The steerable toy as claimed in claim 2, wherein said slip clutch comprises:

a hollow collar extending from said steering wheel, wherein an upper end of said central shaft is received within said collar; and a bushing positioned between said hollow collar and said central shaft, so that both said central shaft and steering wheel rotate when a first torque about a first axis passing through said central shaft is applied to said steering wheel and said steering wheel rotates about the first axis relative to the central shaft when a second torque, having a value greater than said first torque, is applied to said steering wheel.

4. The steerable toy as claimed in claim 3, wherein said central shaft includes a recessed portion and a fastener is received by both said collar and said recessed portion of said central shaft coupling said steering wheel to said central shaft.

5. The steerable toy as claimed in claim 4 further comprising a second fastener passing through said collar and contacting said bushing.

6. The steerable toy as claimed in claim 4, wherein said fastener is a set screw.

7. The steerable toy as claimed in claim 1, wherein said central shaft passes through an elongated slot defined in said frame.

8. The steerable toy as claimed in claim 7, wherein said frame slot is of sufficient length to permit said central shaft to be rotated about the rotational axis of said worm gear.

9. The steerable toy as claimed in claim 7, wherein said slot is defined in an arcuate-shaped portion of said frame.

10. The steerable toy as claimed in claim 1 further comprising a two-position clamp coupled to said central shaft, wherein said clamp prevents said central shaft from rotating in said second mode about the rotational axis of said worm gear when said clamp is in a first locked position and said central shaft can rotate in said second mode about the rotational axis of said worm gear when said clamp is in a second released position.

11. The steerable toy as claimed in claim 10, wherein said worm and worm gear are provided in a gear box and said clamp is coupled to said gear box.

12. The steerable toy as claimed in claim 11, wherein said gear box comprises a gear box housing defining an inner chamber and two side plates secured on opposite sides of said gear box housing, said central shaft received by said gear box housing and said worm and worm gear disposed within said gear box housing, said gear box housing rotatable about the worm gear rotational axis relative to said side plates when said central shaft is rotated in said second mode about said rotational axis of said worm gear.

13. The steerable toy as claimed in claim 12, wherein said clamp comprises a slot defined in one of said side plates, a threaded shaft passing through said slot and secured to said gear box housing and a handle threadably secured to said threaded shaft whereby when said handle is threadably tightened on said threaded shaft, said central shaft is prevented from rotating in said second mode about the worm gear rotational axis relative to said slotted side plate and when said handle is threadably loosened on said threaded shaft and is spaced away from said slotted side plate, said central shaft can rotate in said second mode about the worm gear rotational axis relative to said slotted side plate.

14. The steerable toy as claimed in claim 13, wherein said slot in said side plate is arcuate shaped.

15. The steerable toy as claimed in claim 14, wherein said arcuate-shaped slot of said side plate has a centerline which is an arc of a circle having a center on the worm gear rotational axis.

16. The steerable toy as claimed in claim 2 further comprising a two-position clamp coupled to said central shaft, wherein said clamp prevents said central shaft from rotating in said second mode about the rotational axis of said worm gear when said clamp is in a first locked position, and said central shaft can pivot about the rotational axis of said worm gear in said second mode when said clamp is in a second released position.

17. The steerable toy as claimed in claim 16, wherein said worm and worm gear are provided in a gear box and said clamp is coupled to said gear box.

18. A device for rotating a link arm about an axis comprising:

a frame;

a central shaft;

a worm carried by said central shaft;

a worm gear joined to said frame in meshing relation with said worm, the rotational axes of said worm and said worm gear being substantially perpendicular;

a gear box housing attached to said frame defining an inner chamber, said central shaft received by said gear box housing and said worm and worm gear contained within said gear box housing;

said central shaft capable of rotating in a first mode about said rotational axis of said worm to effect rotation of the link arm about an axis, and said central shaft capable of rotation in a second mode about said rotational axis of said worm gear to effect rotation of the link arm about an axis; and a two-position clamp coupled to said central shaft, wherein said clamp prevents said central shaft from rotating in said second mode about the rotational axis of said worm gear when said clamp is in a first locked position and said central shaft can rotate about the rotational axis of said worm gear in said second mode when said clamp is in a second released position.

19. In a steerable vehicle having a frame, a driver's seat secured to said frame, and a plurality of ground engaging wheels joined to said frame, the improvement comprising:

a steering wheel having a central shaft rotatably connected to said frame, a linkage coupled to said steering wheel and connected to at least one of said ground engaging wheels, said linkage coupled to said steering wheel through said central shaft, and a gearing arrangement, said gearing arrangement includes a worm carried by said central shaft and a worm gear joined to said frame in meshing relation with said worm, the rotational axes of said worm and said worm gear being substantially perpendicular; and said central shaft capable of rotating in a first mode about said rotational axis of said worm to cause said linkage to effect turning of said at least one of said ground engaging wheels, and said central shaft capable of rotating in a second mode about said rotational axis of said worm gear to cause said linkage to effect turning of said at least one of said ground engaging wheels.

20. The steerable vehicle as claimed in claim 19 further comprising a slip clutch coupling said steering wheel to said central shaft.

* * * * *